(12) United States Patent
Greenberger et al.

(10) Patent No.: US 10,761,322 B2
(45) Date of Patent: Sep. 1, 2020

(54) TARGETED CONTENT WITH IMAGE CAPTURE

(71) Applicant: International Business Machines Corporation, Armonk, NY (US)

(72) Inventors: Jeremy A. Greenberger, San Jose, CA (US); Jana H. Jenkins, Raleigh, NC (US); Zachary Greenberger, Raleigh, NC (US); Lisa Seacat Deluca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 15/879,711

(22) Filed: Jan. 25, 2018

(65) Prior Publication Data
US 2019/0227306 A1 Jul. 25, 2019

(51) Int. Cl.
*G02B 27/00* (2006.01)
*G06K 9/00* (2006.01)
(Continued)

(52) U.S. Cl.
CPC ....... *G02B 27/0093* (2013.01); *G02B 27/017* (2013.01); *G06F 1/163* (2013.01);
(Continued)

(58) Field of Classification Search
CPC ... G02B 27/0093; G02B 27/017; G06F 3/013; G06F 3/0304; G06F 3/002; G06F 3/011; G06F 1/163; G06F 3/005; G06K 9/00362; G06K 9/00671; G06K 9/2063; G06K 9/00664
See application file for complete search history.

(56) References Cited

U.S. PATENT DOCUMENTS

| 2012/0290401 | A1 | 11/2012 | Neven | |
|---|---|---|---|---|
| 2013/0127980 | A1* | 5/2013 | Haddick | G06F 3/013 |
| | | | | 348/14.08 |

(Continued)

FOREIGN PATENT DOCUMENTS

CN 105573497 A 5/2016

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Yon J Couso
(74) *Attorney, Agent, or Firm* — Heslin Rothenberg Farley & Mesiti P.C.; Stephanie Carusillo, Esq.

(57) ABSTRACT

A method, computer program product, and visual display apparatus include a processor(s) obtaining, via a camera device, a unique identifier, wherein the unique identifier was captured by the image capture functionality of the camera device during a given temporal period. Based on the unique identifier, the processor(s) determines an application, where a graphical user interface of the application, when rendered through a client during the given temporal period, displayed the unique identifier (and was captured by the camera device). The processor(s) obtain, from the camera device, identifying data relevant to a user associated with the camera device. Based on the unique identifier and the identifying data, the processor(s) provides content targeted to the user.

18 Claims, 6 Drawing Sheets

(51) Int. Cl.
*G06F 3/01* (2006.01)
*G02B 27/01* (2006.01)
*G06F 3/00* (2006.01)
*G06F 1/16* (2006.01)
*G06F 3/03* (2006.01)

(52) U.S. Cl.
CPC .............. *G06F 3/002* (2013.01); *G06F 3/005* (2013.01); *G06F 3/011* (2013.01); *G06F 3/013* (2013.01); *G06F 3/0304* (2013.01); *G06K 9/00362* (2013.01)

(56) References Cited

U.S. PATENT DOCUMENTS

| | | |
|---|---|---|
| 2014/0006181 A1 | 1/2014 | Pisaris-Henderson |
| 2014/0180864 A1* | 6/2014 | Orlov ................ G06Q 30/0631 705/26.7 |
| 2014/0259151 A1* | 9/2014 | Do ....................... G06F 3/0416 726/16 |
| 2017/0024893 A1 | 1/2017 | Kruglick |

* cited by examiner

US 10,761,322 B2

TARGETED CONTENT WITH IMAGE CAPTURE

BACKGROUND

Personal cameras, and specifically, head mounted cameras, once a somewhat onerous accessory reserved for extreme sporting excursions, are now becoming an easily wearable (or an easy to carry) accessory for every day and every situation, including professional situations. The advances in this area, as far as ease of wearing or use, allow the users to experience the advantages of head mounted cameras, and other personal devices with integrated cameras, in many different settings. The advances in image capture technologies enables a user both to capture what is occurring in the physical environment but also to connect more easily with the virtual world.

SUMMARY

Shortcomings of the prior art are overcome and additional advantages are provided through the provision of a method for providing user targeted content. The method includes, for instance: obtaining, by one or more processors, via a camera device, a unique identifier, wherein the unique identifier was captured by the image capture functionality of the camera device during a given temporal period; based on the unique identifier, determining, by the one or more processors, an application, wherein a graphical user interface of the application, when rendered through a client during the given temporal period, displayed the unique identifier, such that the unique identifier was captured by the image capture functionality of the camera device, during the given temporal period; obtaining, by the one or more processors, from the camera device, identifying data relevant to a user associated with the camera device; and based on the unique identifier and the identifying data, providing by the one or more processors, content targeted to the user.

Shortcomings of the prior art are overcome and additional advantages are provided through the provision of a computer program product for providing user targeted content. The computer program product comprises a storage medium readable by a processing circuit and storing instructions for execution by the processing circuit for performing a method. The method includes, for instance: obtaining, by one or more processors, via a camera device, a unique identifier, wherein the unique identifier was captured by the image capture functionality of the camera device during a given temporal period; based on the unique identifier, determining, by the one or more processors, an application, wherein a graphical user interface of the application, when rendered through a client during the given temporal period, displayed the unique identifier, such that the unique identifier was captured by the image capture functionality of the camera device, during the given temporal period; obtaining, by the one or more processors, from the camera device, identifying data relevant to a user associated with the camera device; and based on the unique identifier and the identifying data, providing by the one or more processors, content targeted to the user.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
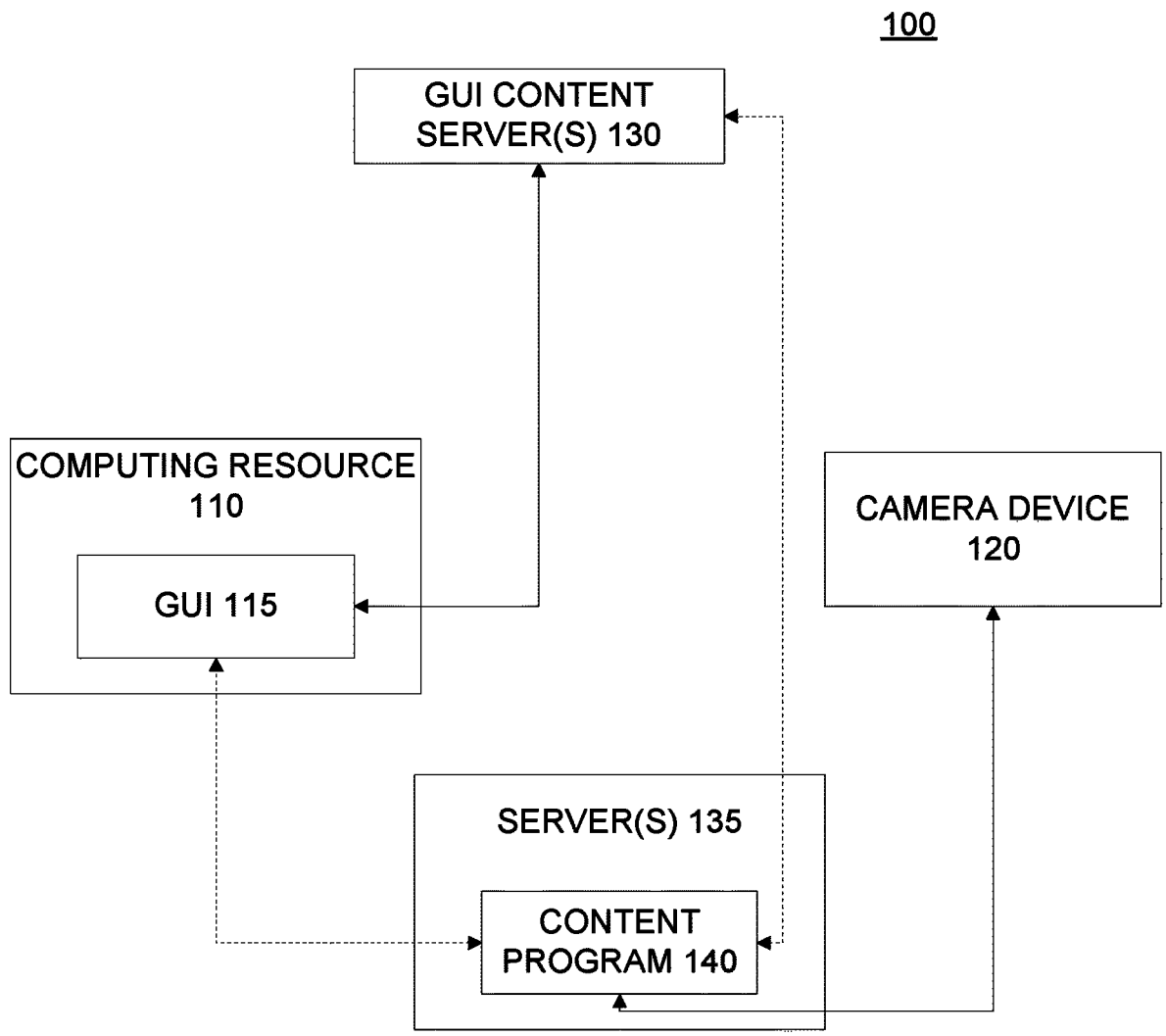
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
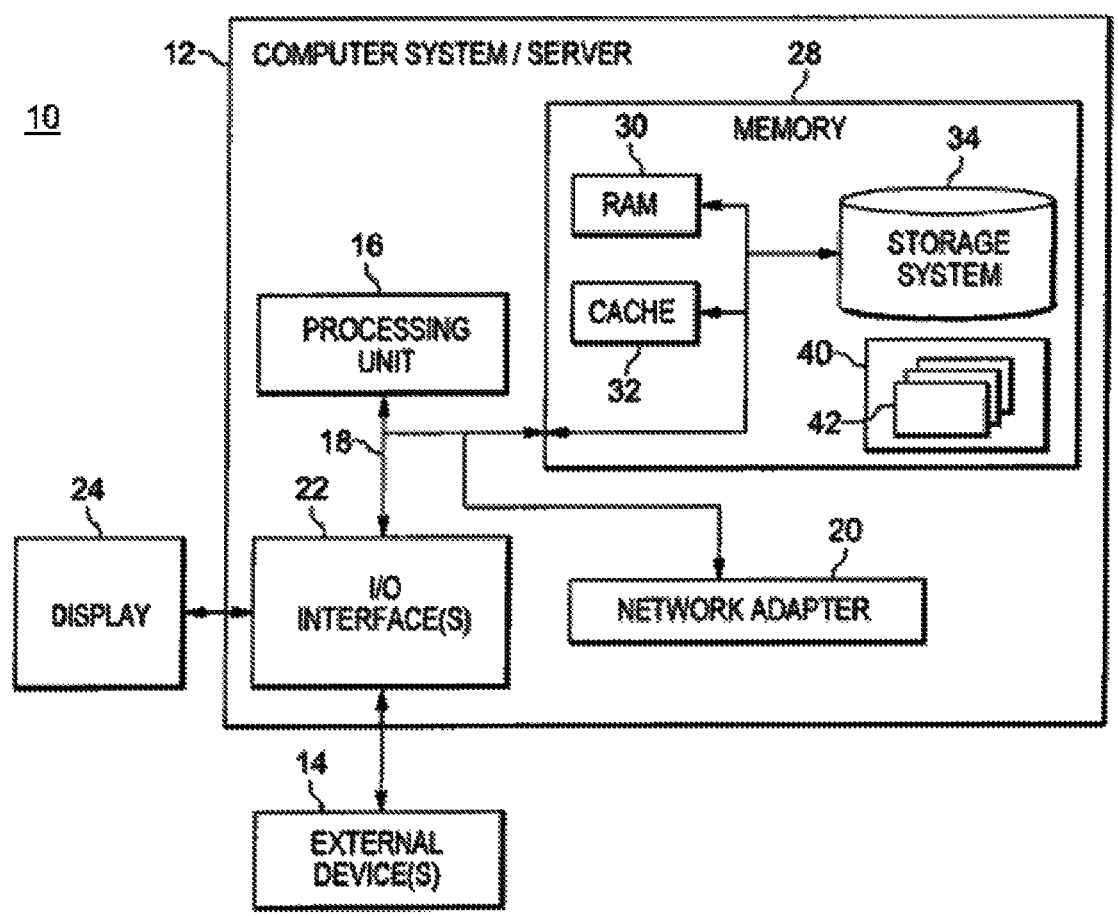
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Embodiments of the present invention include a computer-implemented method, a computer program product, and a computer system where one or more programs: 1) receive a unique identifier from a graphical user interface (GUI) via a visual aspect of the GUI, including but not limited to the GUI of the website, being captured by a camera device of a user, including but not limited to, a head mounter camera, viewing the GUI; 2) identify the user of the camera and the GUI being viewed; and 3) provide content for display on the GUI that is targeting to the user of the camera, who is viewing the GUI. In embodiments of the present invention where the GUI is a GUI of a website and the camera is a head mounted device, embodiments of the present invention include a computer-implemented method, a computer program product, and a computer system where one or more programs: 1) receive a unique identifier from a website via a visual aspect of the graphical user interface (GUI) of the website being captured by a head mounted camera device of a user viewing the GUI; 2) identify the user of the head mounted camera and the website being viewed; and 3) provide content for display on the website that is targeting to the user of the head mounted device who is viewing the website. In an embodiment of the present invention, the one or more programs may identify the user based on various aspects available via the camera device (e.g., a head mounted camera device), including the unique identifier of the device and/or a user profile associated with the device. The one or more programs provide the content based on data associated with the user, upon identification of the user, including but not limited to, attributes available in a user profile and/or the viewing history of the user, as available through the device. Embodiments of the present invention are portable and may be utilized with various off-the-shelf head mounted camera products, including but not limited to Google Glass, Samsung Gear, and/or Snapchat Spectacles.

Certain aspects of embodiments of the present invention provide various advantages over existing systems and are inextricably tied to computing. Existing systems may target content to users by identifying the users through browser cookies and/or other technologies that ascertain that a computing device utilized to display a website, through a browser. Some existing technologies may tie content displayed to profile tied to login credentials that a user may utilize to access a given web application. However, the user of the computing device may change (as devices are shared) and thus, the user can be erroneously identified. For example, a user may be shown content that is relevant to a subject in which the user has no interest because the computing resource was recently used by a colleague who has an interest in that subject. Instead of or in addition to keying content to a computing resource, browser, and/or web application, one or more programs in embodiments of the present invention recognize a user based on the camera device (e.g., a head mounted camera device or other image capture device) that he or she is utilizing (e.g., wearing) when interacting with program code rendered on a computing resource, through a graphical user interface (GUI). In embodiments of the present invention, the one or more programs utilize data from camera device not only to identify what a user is viewing at a given time, but, also, the user, including, but not limited to, the browsing habits of the user and/or user preferences and/or attributes. Thus, embodiments of the present invention provide a concrete way to identify both a user and what the user is viewing, at a given instant, in order to provide targeted content to that user, via what the user is viewing, at that given instant. The unique utilization of hardware and temporally dependent software mechanisms in embodiments of the present invention is inextricably tied to computing and provides an advantage in the area of targeted electronic content.

FIG. 1 is a diagram representing a technical environment 100 in which aspects of embodiments of the present invention may be implemented. Computing resource 110 is a computing device that is capable of displaying content (e.g., from a website, application, digital signage, etc.), for example, through a GUI 115, which may be, for example, a client, a thin client, and/or a web browser. A user with a camera device 120 oriented at the GUI 115 (e.g., a user wearing a head mounted camera device or orienting a smartphone or smartwatch in a manner that enables a viewer of the camera to obtain content displayed in the GUI 115) utilizes computing resource 110 to view and interact with the displayed content. In some embodiments of the present invention, the GUI 115 on the computing resource 110 where the content is displayed is a thin client and the content of the website itself is served from one or more content servers 130. (The term website is used to refer to one or more webpages that are accessible to a user via a common domain and the term application is used broadly to refer to any software with which a user may interact through a GUI, including, but not limited to, a website.) The GUI content server(s) 130 may be part of a distributed or shared computing environment, such as a cloud. For each instance of the application displayed, the program code for the application, executed by the GUI content server(s) 130 populate, in the GUI 115 of the computing resource 110, a unique visual element. This particular element may not be perceivable as uncommon to the user (i.e., it may be a subtle graphical element that blends into the display, visually). In some embodiments of the present invention, the GUI content server(s) 130 is a web server that serves a website or web application for display in a web browser (e.g., GUI 115). In some embodiments of the present invention, the GUI content server(s) 130 is an application server that serves an application to a computing resource 110 that a user accesses through a GUI 115.

The unique visual element comprises a unique identifier provided to the GUI content server(s) 130 and/or the GUI 115 on the computing resource 110 by one or more servers 135 executing a targeted content program 140. In some embodiments of the present invention, where the GUI 115 is a web browser and displays a website, the GUI content server(s) 130 may be web servers. In some embodiments of the present invention, the targeted content program 140 includes an advertising program. The targeted content program represents any provider of targeted content, regardless of whether the purpose is commercial, media-related, or for another reason. In some embodiments of the present invention, the targeted content program 140 can be used with a recommendation engine to populate a user interface with content that is most relevant to a viewer.

The unique identifier may be specific to a particular time period and may change as the time period expires and a new period begins. The one or more servers 135 executing a targeted content program 140 provide the GUI content server(s) 130 and/or the GUI 115 rendering the GUI content (e.g., the website and/or application) on the computing resource 100 with the unique identifier that forms the technical basis of the unique visual element, without having access to the GUI content server(s) 130. For example, a developer of the program code for an application rendered in the GUI 115 may include in the code a call to the targeted content program 140. Thus, when the program code is displayed by a GUI 115, providing an instance of the application to a user at a given time, the code (dynamically) pulls a unique identifier provided by the targeted content program 140 at that time, to include in the resultant application instance, as a unique visual element. Thus, the unique identifier is dynamically provided, by the targeted content program 140, responsive to the execution of program code provided by the server(s) 130, in the GUI 115, in an instance of an application (e.g., a session, website session), displayed in the GUI 115 (e.g., browser, thin client), on a computing resource 110.

As understood by one of skill in the art, application (e.g., web) developers integrate calls to other sources, into the application (e.g., website) program code, for content for display. The program code of the application may specify a physical location for the content from the other source, when the application is displayed. For example, existing advertising programs, which are a non-limiting example of content programs 140, will provide banner advertisements that are displayed in a website (a non-limiting example of content and/or an application rendered in a GUI 115). The code that generates the banner advertisements is not part of the program code of the website, but, rather, the program code of the website defines a location for the banner ads in the displayed website and includes a call to the program that serves the advertisement, to provide the content for that location. Thus, in some embodiments of the present invention, a GUI 115 on a computing resource 110 that displays a website will dynamically display banner advertisements from the source specified in the call, in the location specified in the program code of the website, executed by the GUI 115.

In some embodiments of the present invention, the program code of the website was modified by a developer to provide instructions for how to display the unique identifier, to be supplied dynamically by the targeted content program 140, when content, such as an application or a website, is rendered in the GUI 115. For example, the program code may include a location for the unique identifier and code specifying the appearance that the unique identifier will take in the context of the displayed application and/or web site, so that the result is the unique visual element. Depending on a value of the unique identifier, the program code may specify a modification to an existing graphical elements. Based on the unique identifier (e.g., a value of the unique identifier), the resultant unique visual element displayed in a GUI 115 may include, but is not limited to, a background barcode that displays an image, a background color, a specific ordering of elements in the display content, the size of a graphical element of the displayed content, the opacity of an image. As a new unique identifier may be displayed at a different time, the attributes of the unique visual element may change to reflect the change in the value.

When the unique visual element (which provide the unique identifier) is captured (e.g., perceived) by the camera device 120 (e.g., a head mounted camera device), one or more programs executing on the camera device 120 and/or on at least one second computing resource communicatively coupled with the camera device 120 (and receiving the image based on the image capture functionality of the camera device 120), provide one or more servers 135 executing a targeted content program 140 with identifying information about the user (associated with a camera device, including but not limited to, wearing the head mounted camera device 120) and the unique visual element. The identifying information may include biographical or location-based information about the user, past viewing history of the user (obtained via the image capture capabilities of the camera device 120). The identifying information may include attributes in a user profile, including a social media profile, of the user. The one or more program may identify the user based on a unique identifier associated with the camera device 120 that the user is utilizing (e.g., wearing). In the example where the identifying information is a user profile, the user may have registered a specific user profile to the camera device 120.

Based on obtaining the unique visual element (and therefore the underlying unique identifier) and the user identifying information, the targeted content program 140 receives data regarding what a given user is seeing at a given time, and who that user is. In some embodiments of the present invention, one or more programs executing on a processing resource of the camera device 120 communicate with the targeted content program 140 directly (e.g., via Bluetooth) to share the identifier and the unique visual element (and/or its underlying unique identifier) with the targeted content program 140. In another embodiment of the present invention, one or more programs executing on the camera device 120 (or on a computer resource communicatively coupled to the camera device 120) make a call to an application programming interface (API) to indicate the unique visual element (and/or the underlying unique identifier) was found. Based on receiving the call, the targeted content program 140 obtains the user identifying data from the camera device 120 and/or the associated computer resource.

Based in receiving the unique visual element and the user identifying information, the targeted content program 140 displays targeted content in the GUI 115 of the computing resource 110. The targeted content program 140 may determine the content based on receiving data indicating that more than one user is viewing the application/website served by the GUI content server(s) 130 at a given instance, based on receiving the same unique visual element from a number of users, together with identifying data. In this situation, the targeted content program 140 may select content that represents a commonality of interests or attributes across the identifying data. For example, if the identifying data include attributes of a user profile, and there is a common attribute across the identifying data of a threshold number of users perceiving the application/website at a given instance (or time period), the targeted content program 140 displays may display content that is targeting based on the commonality of the users.

In some embodiments of the present invention, the targeted content program 140 provides the targeted content to one or more programs of the camera device 120. The one or more programs of camera device 120 can utilize the display capabilities of this device to provide the content to the user. For example, if the camera device 120 is a head mounted camera device, the one or more programs of the head mounted camera device utilize the display of this device to display content to the wearer.

In some embodiments of the present invention, the targeted content program 140 may have a pre-defined time period in which it displays targeted content in the application or website (which is rendered in the GUI 115) based on the last identified user. The targeted content may include a given advertisement and/or a particular presentation of data on the website or in the application, including but not limited to, an order of items on an ecommerce website or application. Based on identifying the user, the targeted content program 140 may change a product image displayed on the website or application, change the orientation or view of a product image displayed on the website or application, change the color or pattern of a product displayed on a website or application, change text associated with a product on the website or application, etc. The targeted content program 140 may provide the content to the website or application, displayed in the GUI 115, in the same manner as it provided the unique identifier. As discussed above, program code that is executed on the computing resource 110 to render the website in the GUI 115, may include code that calls the targeted content program 140 and designates where content supplied by the called entity, the targeted content program 140, will be rendered. Thus, the targeted content program 140 can dynamically supply the content responsive to the call from the GUI 115. Alternatively, the targeted content program 140 may communicate the GUI content to the server(s) 130, which dynamically integrate the content into the program code served to GUI 115 (e.g., a web browser or thin client) requesting the content of the website/application from the GUI content server(s) 130. The targeted content program 140 may retain a unique identifier for the user and the user's view of the website/application, so that should the same user access another website/application (as identified through the identifying information supplied obtained with the new website's or the new application's unique identifier and/or unique visual content), the targeted content program 140 may further tune the targeted content to be served to the user, based on the browsing history of the user, known to the targeted content program 140.

Figure 2:
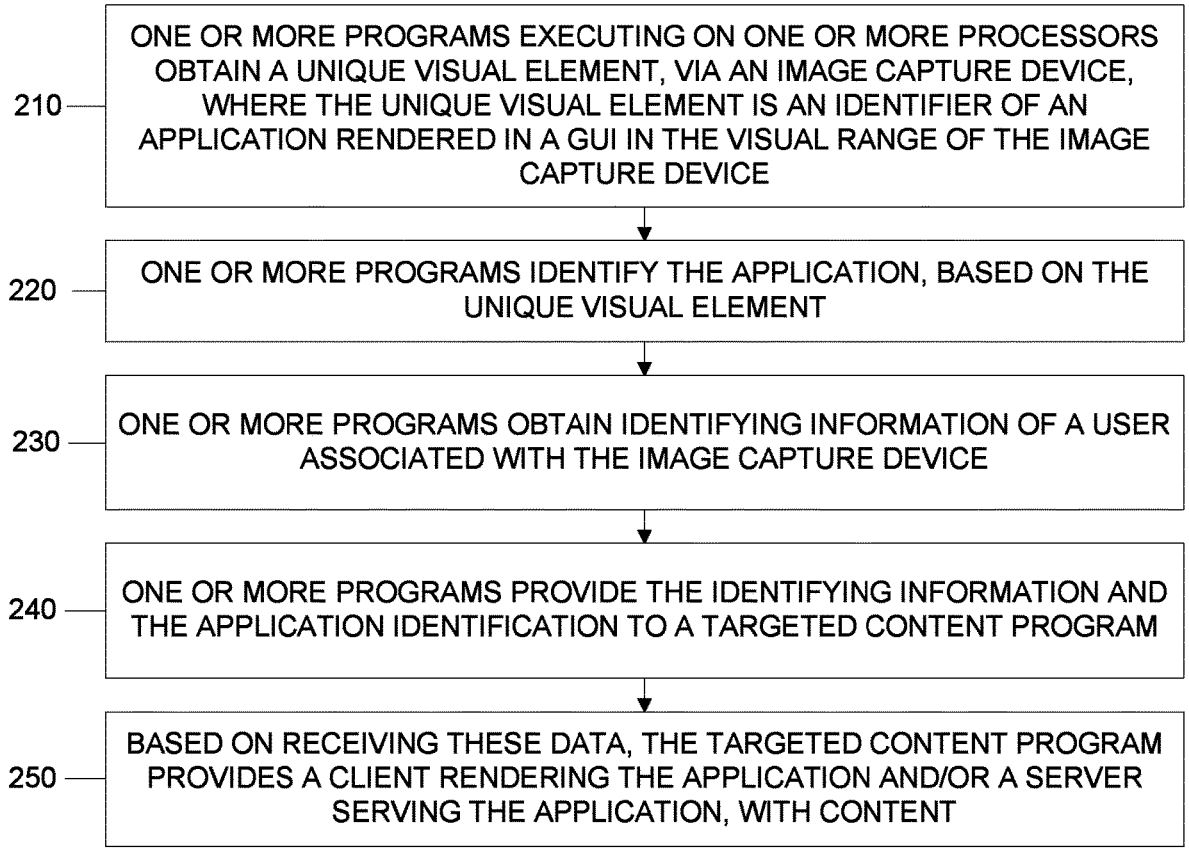
FIG. 2 is a workflow illustrating certain aspects of an embodiment of the present invention.

FIG. 2 is a workflow 200 that illustrates certain aspects of some embodiments of the present invention. In an embodiment of the present invention, one or more programs executing on one or more processors obtain a unique visual element, via an image capture device (e.g., a head mounted image capture device), where the unique visual element is an identifier of an application (e.g., a website, a web application) in the visual range of the image capture device (210). The unique visual element may be an identifier of a particular instance of the application. An instance may refer to any rendering of the application by a GUI 115 during a defined time period. Applications include websites. In some embodiments of the present invention, the one or more processors are integrated into the image capture device and in some embodiments, the one or more processors are external to the device, but communicatively coupled and receive data from the image capture device. As explained above, the unique visual identifier is included in the website, upon display of the application in a GUI 115, based on a call in the program code to a targeted content program 140 that provides an identifier for the application and optionally, for a time of display of the application, that is displayed as the unique visual element, in the GUI 115. Thus, the unique visual element has an underlying identifier.

In some embodiments of the present invention, the one or more programs identify the application, based on the unique visual element (220). The one or programs, if relevant, may also identify the particular instance of the application (e.g., a particular instance of a website) and/or the time period for which the unique visual element is served by a content server(s) 130 (e.g., one or more webservers) for display in a GUI 115. In some embodiments of the present invention, the one or more programs may not identify the application, but determine that a unique visual element has been captured by the image capture device.

The one or more programs obtain identifying information of a user associated with the image capture device (230) (e.g., in the case of a head mounted device or an otherwise wearable device, data relevant to the user wearing the device). In some embodiments of the present invention, the one or more programs may obtain a unique identifier associated with the image capture device and query a user database to obtain user data associated with the unique identifier. In another embodiment of the present invention, the one or more programs may obtain attributes from a user profile associated with the image capture device and/or the unique identifier of the image capture device. In some embodiments of the present invention, the identifying information includes a history of websites viewed by the user, obtained from the photo or video stream of the image capture device.

The one or more programs provide the identifying information and the application identification (or the unique visual element and/or its underlying identifier) to a targeted content program (240). In some embodiments of the present invention, the one or more programs communicate with the targeted content program 140 directly (e.g., via Bluetooth) to share the identifying information (of the user of this hardware device) and the unique visual element (and/or its underlying unique identifier) with the targeted content program 140. In another embodiment of the present invention, one or more programs executed on the camera device 120 (or on a computer resource communicatively coupled to the camera device 120) make a call to an application programming interface (API) to indicate the unique visual element (and/or the underlying unique identifier) was found.

Based on receiving these data, the targeted content program 140 provides a client (e.g., a thin client, a web browser) rendering the application or a server serving the application (e.g., the web browser rendering the website and/or a web server serving the website), with content (250). As discussed above, the content may be an advertisement or other content which the targeted content program 140 can make available to a GUI 115 responsive to a call executed in rendering the application. The targeted content program 140 may also provide the content directly to the server serving the application (e.g., a web server serving a website), and program code executed by the server may integrate the content into the program code rendered in the GUI 115. The targeted content program 140 may provide the content for a given time period of time and may supply new content for different time periods. The unique identifier (of the unique visual element) may provide the targeted content program 140 with the time period for which to provide the (targeted) content.

In some embodiments of the present invention, once a user is recognized by the one or more programs (i.e., the one or more programs have obtained identifying data), targeted user content program 140 can continue to use the user information, for example, as part of a user profile, in order to provide the user with targeted content through various interfaces, including applications and websites. Other than providing content, storing a user profile of a recognized user, the targeted content program 140 may also provide the user with shortcuts, through the GUI 115, including but not limited to, a shortcut the provides two-factor authentication for signing into an online account. In some embodiments of the present invention, after the targeted user content program 140 has received the identifying information and the application identification, the targeted user content program 140 may utilize the data to generate or update a user profile. Thus, upon identifying the user at a time in the future, the program may retrieve the user profile and utilize it to select or generate targeted content to provide to the user.

Figure 3:
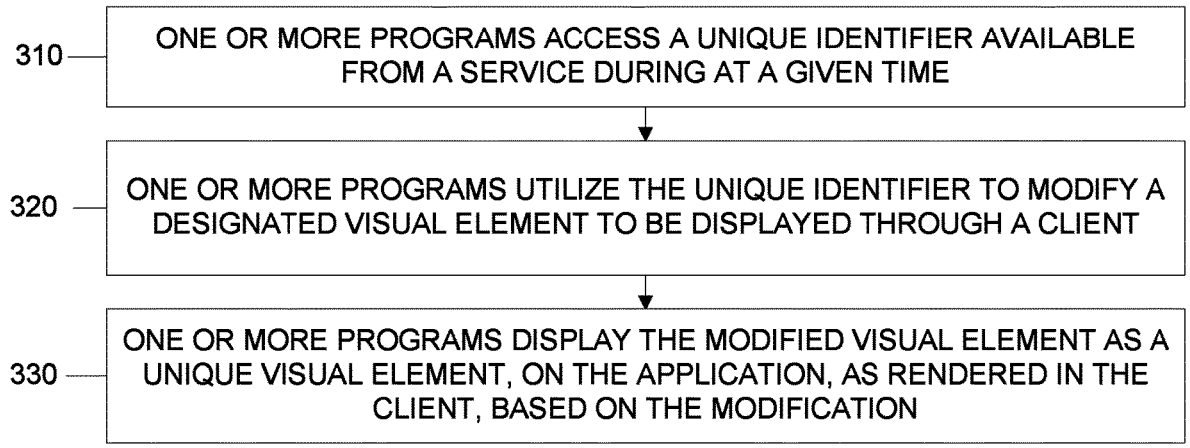
FIG. 3 is a workflow illustrating certain aspects of an embodiment of the present invention.

FIG. 3 is a workflow 300 that illustrates the integration of a unique identifier into a website, which is one example of an application into which aspects of embodiments of the present invention may be integrated. In some embodiments of the present invention, one or more programs executed by one or more processors (e.g., on a computing resource executing a thin client, such as a web browser), access a unique identifier available from a service during at a given time (310). The one or more programs utilize the unique identifier to modify a designated visual element to be displayed through a web browser (320). The one or more programs display the modified visual element as a unique visual element, on the website, as rendered in the web browser, based on the modification (330). As understood by one of skill in the art, a web browser is an example of a client that can be utilized to render an interface, such the website example used in FIG. 3. The interface may include applications, websites, digital signage, etc.

Figure 4:
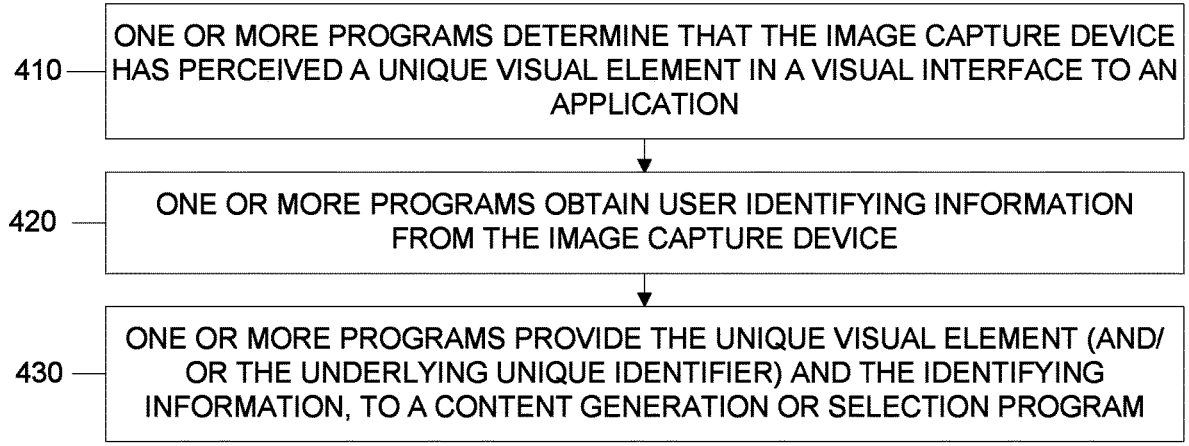
FIG. 4 is a workflow illustrating certain aspects of an embodiment of the present invention.

FIG. 4 is a workflow 400 that illustrates the perception of the unique identifier displayed in a web browser, by a head mounted image capture device (and/or any Internet of Things device capturing the interactions of the user with a web browser) in some embodiments of the present invention. In an embodiment of the present invention, one or more programs executed by a processor integrated into the head mounted image capture device and/or a processing device communicatively coupled to the head mounted image capture device determine that the head mounted image capture device has perceived (e.g., captured) a unique visual element on a website (410). The one or more programs may extract the unique identifier from the unique visual element.

The one or more programs obtain user identifying information from the head mounted image capture device (420). The user identifying information may include a unique identifier associated with the hardware, which the one or more programs may utilize (or may hand off to the targeted content program 140 to utilize) to determine the identity of the user. The identifying information may include attributes from a user profile associated with the hardware. The identifying information may also include the viewing history of the camera. As understood by one of skill in the art, the specific identity of the user, although helpful, is not necessary, to target the user with content. Information available about the user and the user's habits on the hardware device can allow the targeted content program 140 to select compatible (e.g., targeted) content.

Based on determining the perception of the unique visual element, the one or more programs provide the unique visual element (and/or the underlying unique identifier) and the identifying information, to a targeted content program 140 (e.g., content generation or selection program, advertising program, etc.) (430). The one or more programs may provide this data to the targeted content program 140 using a variety of communication/transmission methods. For example, the one or more programs may communicate directly with the program (e.g., via Bluetooth) to share the identifier and the unique visual element (and/or its underlying unique identifier). In another embodiment of the present invention, the one or more programs make a call to an API to indicate the unique visual element (and/or the underlying unique identifier) was found.

Figure 5:
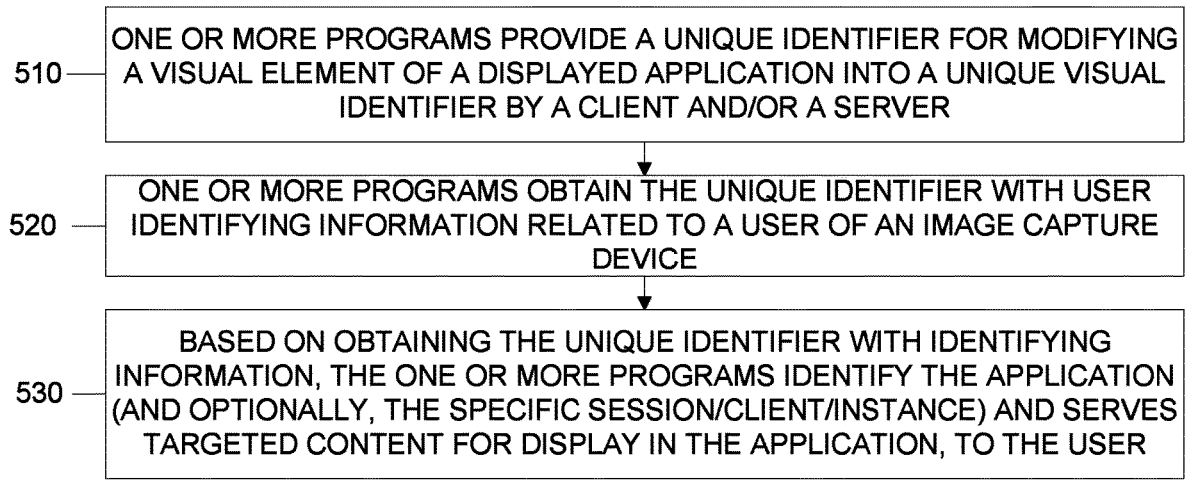
FIG. 5 is a workflow illustrating certain aspects of an embodiment of the present invention.

FIG. 5 is a workflow 500 that illustrates aspects of the targeted content program 140 (e.g., an advertising program) in some embodiments of the present invention. In an embodiment of the present invention, one or more programs executed on or more processors provide a unique identifier for modifying a visual element of a displayed in an interface, including but not limited to, a website, into a unique visual identifier by a client (e.g., a web browser) and/or a server (e.g., web server) (510). The one or more programs may provide a different unique identifier dependent on the time period. The one or more programs may also or additionally provide a different unique identifier per request (e.g., by a browser rendering the website, by a user launching the client for an application).

The one or more programs obtain the unique identifier with user identifying information related to a user of an image capture device (e.g., a head mounted camera device or other IoT device) (520). Based on obtaining the unique identifier with identifying information, the one or more programs identify the application (e.g., the website) and optionally, the specific session/browser/instance and serves targeted content for display in the application (e.g., website), to the user (530). The content may be time limited and the one or more programs may provide different content after the time period lapses. The one or more programs may generate the content and/or select relevant content available to the one or more programs.

In some embodiments of the present invention, rather than make the targeted content available to a web browser or web server, the one or more programs that serve the targeted content may provide this content to the head mounted image capture device, for display by this device, rather than by the website.

Embodiments of the present invention include a computer-implemented method, a computer program product, and a computer system that include one or more programs that obtain, via a camera device, a unique identifier, wherein the unique identifier was captured by the image capture functionality of the camera device during a given temporal period. Based on the unique identifier, the one or more programs determine an application, wherein a graphical user interface of the application, when rendered through a client during the given temporal period, displayed the unique identifier, such that the unique identifier was captured by the image capture functionality of the camera device, during the given temporal period. The one or more programs obtain, from the camera device, identifying data relevant to a user associated with the camera device. Based on the unique identifier and the identifying data, the one or more programs provide content targeted to the user.

In some embodiments of the present invention, the unique identifier includes a unique visual identifier on a page of the application and obtaining the unique identifier includes: the one or more programs obtaining, from the camera device, an image comprising the unique visual identifier and the one or more programs determining that the unique visual identifier is the unique identifier of the application during the temporal period.

In some embodiments of the present, the one or more programs provide the unique identifier, to the client, responsive to a request from the client, during the temporal period. The client, responsive to receiving the unique identifier, may modify the unique identifier to generate the unique visual identifier.

In some embodiments of the present invention, the one or more programs also provide the unique identifier, to a content server providing content for the graphical user interface, wherein the content server provides the unique identifier to the client. The content server, responsive to receiving the unique identifier, may modify the unique identifier to generate the unique visual identifier.

In some embodiments of the present invention, the one or more programs provide the targeted content to the user by populating, in the graphical user interface, content targeted to the user.

In some embodiments of the present invention, the one or more programs provide the content targeted to the user by transmitting, to the camera device, the content targeted to the user.

In some embodiments of the present invention, the identifying data includes a unique identifier associated with the camera device. The identifying data may include user attributes in a profile accessible to the camera device.

In some embodiments of the present invention, the camera device is a head mounted camera device and the user associated with the camera device is a wearer of the camera device.

In some embodiments of the present invention, the application is selected from the group consisting of: a web application, a website, and digital signage.

In some embodiments of the present invention, the client is selected from the group consisting of: a thin client, a mobile application, and a web browser.

In some embodiments of the present invention, based on the unique identifier and the identifying data, the one or more programs generate a user profile for the user. The one or more programs retain the user profile in a memory communicatively coupled to the one or more processors. The one or more programs may obtain, from the camera device, the identifying data relevant to the user associated with the camera device. Based on obtaining the identifying data relevant to the user, the one or more programs may retrieve the user profile from the memory. Based on the user profile, the one or more programs provide additional content targeted to the user.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the GUI content server(s) 130, computing resource 110, and/or one or more servers 135 executing an targeted content program 140 can each be understood as a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
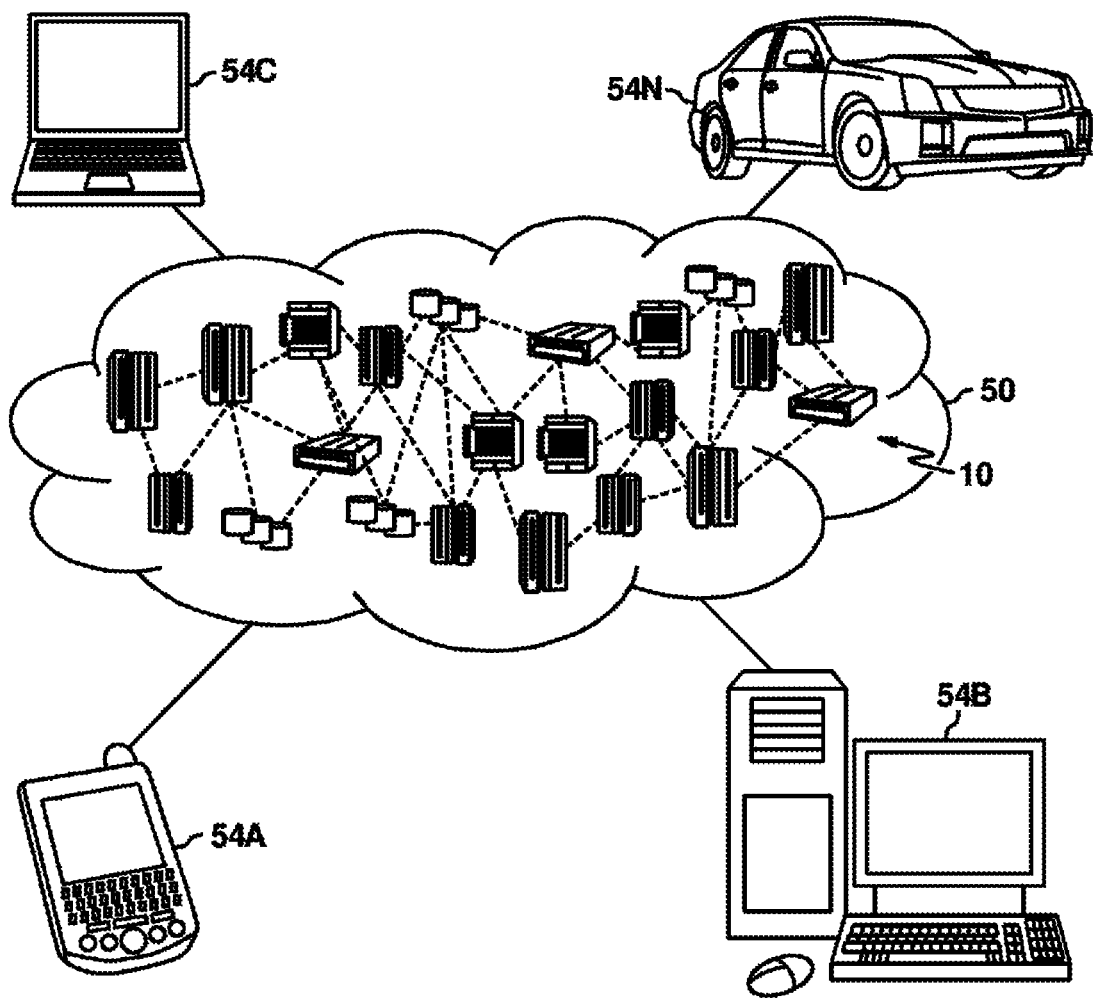
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
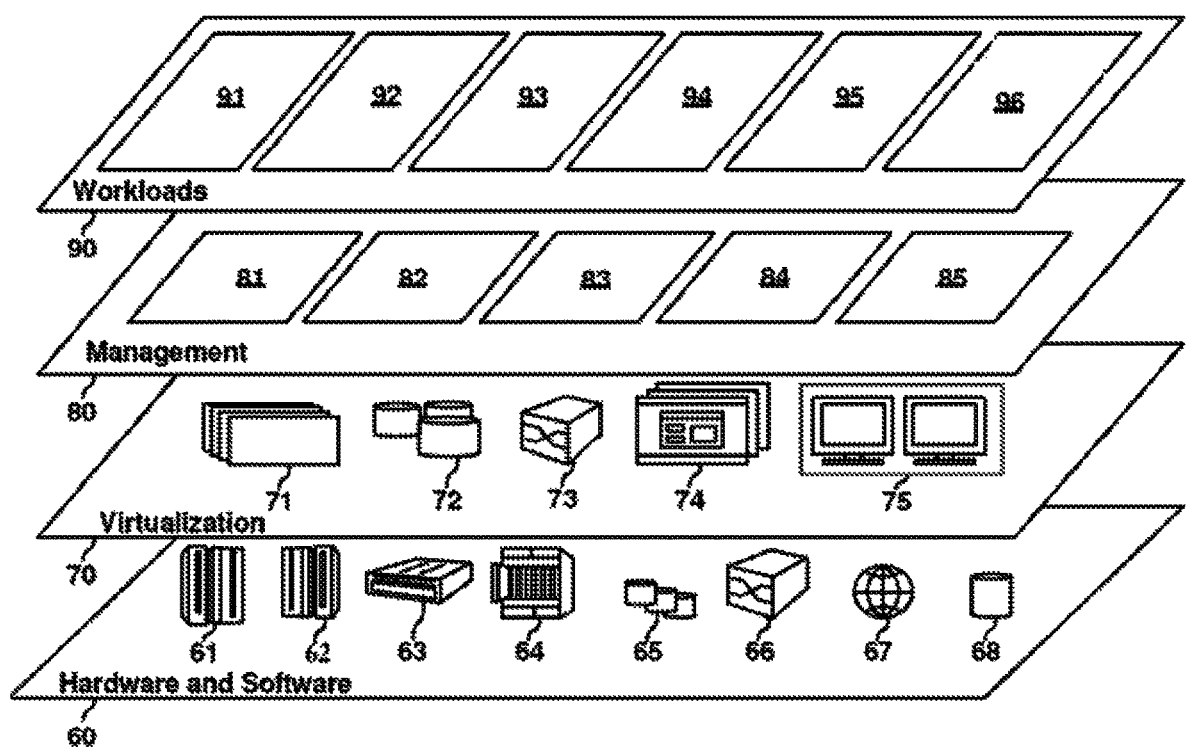
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing targeted content 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, via a camera device oriented to capture images of graphical user interfaces of applications rendered on an output surface of a client, a unique identifier, wherein the unique identifier was captured by the image capture functionality of the camera device during a given temporal period, wherein the unique identifier comprises a unique visual identifier on a page of an application displayed on the an output surface of the client, and wherein obtaining the unique identifier comprises:
   obtaining, by the one or more processors, from the camera device, an image comprising the unique visual identifier; and
   determining, by the one or more processors, that the unique visual identifier is the unique identifier of the application during the temporal period;
   based on the unique identifier, determining, by the one or more processors, an identity of the application, wherein a graphical user interface of the application, when rendered through the output surface of the client during the given temporal period, displayed the unique identifier, such that the unique identifier was captured by the image capture functionality of the camera device, during the given temporal period;
   obtaining, by the one or more processors, from the camera device, identifying data relevant to a user associated with the camera device; and
   based on the unique identifier and the identifying data, providing by the one or more processors, content targeted to the user.

2. The computer-implemented method of claim 1, further comprising:
   providing, by the one or more processors, the unique identifier, to the client, responsive to a request from the client, during the temporal period.

3. The computer-implemented method of claim 2, wherein the client, responsive to receiving the unique identifier, modifies the unique identifier to generate the unique visual identifier.

4. The computer-implemented method of claim 1, further comprising:
   providing, by the one or more processors, the unique identifier, to a content server providing content for the graphical user interface, wherein the content server provides the unique identifier to the client.

5. The computer-implemented method of claim 4, wherein the content server, responsive to receiving the unique identifier, modifies the unique identifier to generate the unique visual identifier.

6. The computer-implemented method of claim 1, wherein providing the content targeted to the user comprises:
   populating, by the one or more processors, in the graphical user interface, content targeted to the user.

7. The computer-implemented method of claim 1, wherein providing the content targeted to the user comprises:
   transmitting, by the one or more processors, to the camera device, the content targeted to the user.

8. The computer-implemented method of claim 1, wherein the identifying data comprises a unique identifier associated with the camera device.

9. The computer-implemented method of claim 1, wherein the identifying data comprises user attributes in a profile accessible to the camera device.

10. The computer-implemented method of claim 1, wherein the camera device is a head mounted camera device and the user associated with the camera device is a wearer of the camera device.

11. The computer-implemented method of claim 1, wherein the application is selected from the group consisting of: a web application, a website, and digital signage.

12. The computer-implemented method of claim 1, further comprising:
   based on the unique identifier and the identifying data, generating, by the one or more processors, a user profile for the user; and
   retaining, by the one or more processors, the user profile in a memory communicatively coupled to the one or more processors.

13. The computer-implemented method of claim 12, further comprising:
obtaining, by the one or more processors, from the camera device, the identifying data relevant to the user associated with the camera device;
based on obtaining the identifying data relevant to the user, retrieving, by the one or more processors, the user profile from the memory; and
based on the user profile, providing, by the one or more processors, additional content targeted to the user.

14. A computer program product comprising:
a non-transitory computer readable storage medium readable by one or more processors and storing instructions for execution by the one or more processors for performing a method comprising:
obtaining, by the one or more processors, via a camera device oriented to capture images of graphical user interfaces of applications rendered on an output surface of a client, a unique identifier, wherein the unique identifier was captured by the image capture functionality of the camera device during a given temporal period, wherein the unique identifier comprises a unique visual identifier on a page of an application displayed on the an output surface of the client, and wherein obtaining the unique identifier comprises:
obtaining, by the one or more processors, from the camera device, an image comprising the unique visual identifier; and
determining, by the one or more processors, that the unique visual identifier is the unique identifier of the application during the temporal period;
based on the unique identifier, determining, by the one or more processors, an identity of the application, wherein a graphical user interface of the application, when rendered through the output surface of the client during the given temporal period, displayed the unique identifier, such that the unique identifier was captured by the image capture functionality of the camera device, during the given temporal period;
obtaining, by the one or more processors, from the camera device, identifying data relevant to a user associated with the camera device; and
based on the unique identifier and the identifying data, providing by the one or more processors, content targeted to the user.

15. The computer program product of claim 14, further comprising:
providing, by the one or more processors, the unique identifier, to the client, responsive to a request from the client, during the temporal period.

16. The computer program product of claim 15, wherein the client, responsive to receiving the unique identifier, modifies the unique identifier to generate the unique visual identifier.

17. A system comprising:
a memory;
one or more processors in communication with the memory;
program instructions executable by the one or more processors via the memory to perform a method, the method comprising:
obtaining, by the one or more processors, via a camera device oriented to capture images of graphical user interfaces of applications rendered on an output surface of a client, a unique identifier, wherein the unique identifier was captured by the image capture functionality of the camera device during a given temporal period, wherein the unique identifier comprises a unique visual identifier on a page of an application displayed on the an output surface of the client, and wherein obtaining the unique identifier comprises:
obtaining, by the one or more processors, from the camera device, an image comprising the unique visual identifier; and
determining, by the one or more processors, that the unique visual identifier is the unique identifier of the application during the temporal period;
based on the unique identifier, determining, by the one or more processors, an identity of the application, wherein a graphical user interface of the application, when rendered through the output surface of the client during the given temporal period, displayed the unique identifier, such that the unique identifier was captured by the image capture functionality of the camera device, during the given temporal period;
obtaining, by the one or more processors, from the camera device, identifying data relevant to a user associated with the camera device; and
based on the unique identifier and the identifying data, providing by the one or more processors, content targeted to the user.

18. The computer-implemented method of claim 1, wherein the client comprises a computing device utilized by the user.

* * * * *